US012671710B2

(12) United States Patent
Lin et al.

(10) Patent No.: US 12,671,710 B2
(45) Date of Patent: Jun. 30, 2026

(54) AUTOMATICALLY INVESTIGATING SECURITY ALERTS FOR SECURITY OPERATIONS CENTER (SOC)

(71) Applicant: Datadog, Inc., New York, NY (US)

(72) Inventors: Dianhuan Lin, Palo Alto, CA (US); Xiaofei Guo, Palo Alto, CA (US)

(73) Assignee: Datadog, Inc., New York, NY (US)

( * ) Notice: Subject to any disclaimer, the term of this patent is extended or adjusted under 35 U.S.C. 154(b) by 60 days.

(21) Appl. No.: 18/826,337

(22) Filed: Sep. 6, 2024

(65) Prior Publication Data

US 2026/0075070 A1     Mar. 12, 2026

(51) Int. Cl.
*H04L 9/40*          (2022.01)

(52) U.S. Cl.
CPC ...... *H04L 63/1425* (2013.01); *H04L 63/1416* (2013.01)

(58) Field of Classification Search
CPC .................... H04L 63/1425; H04L 63/1416
See application file for complete search history.

(56) References Cited

U.S. PATENT DOCUMENTS

| | | |
|---|---|---|
| 10,489,393 B1 | 11/2019 | Holmes et al. |
| 10,963,497 B1 | 3/2021 | Samangooei et al. |
| 11,633,860 B2 | 4/2023 | Lá zaro-Gredilla et al. |
| 11,669,779 B2 | 6/2023 | Shang et al. |
| 11,755,726 B2 | 9/2023 | Ma et al. |
| 11,861,472 B2 | 1/2024 | Shang et al. |

| | | | |
|---|---|---|---|
| 2021/0049413 A1 | 2/2021 | Ma et al. | |
| 2021/0377303 A1 | 12/2021 | Bui et al. | |
| 2021/0377304 A1 | 12/2021 | Ma et al. | |
| 2021/0392146 A1 | 12/2021 | Lin et al. | |
| 2021/0392147 A1 | 12/2021 | Ma et al. | |
| 2022/0067581 A1 | 3/2022 | Kumar et al. | |
| 2022/0116421 A1 | 4/2022 | Yadav et al. | |
| 2023/0115982 A1 | 4/2023 | Lin et al. | |
| 2023/0155902 A1 | 5/2023 | Frazier et al. | |
| 2023/0254318 A1 | 8/2023 | Hu et al. | |
| 2023/0262074 A1 | 8/2023 | Guo et al. | |
| 2023/0353587 A1 | 11/2023 | Bui et al. | |
| 2023/0370495 A1 | 11/2023 | Desai et al. | |
| 2024/0080329 A1 | 3/2024 | Reed et al. | |
| 2024/0119120 A1 | 4/2024 | Zhang et al. | |
| 2024/0403428 A1* | 12/2024 | Lal ........................ | G06F 21/566 |

* cited by examiner

*Primary Examiner* — Ayoub Alata
(74) *Attorney, Agent, or Firm* — Lerner David LLP

(57)          ABSTRACT

Systems and methods for automatically investigating potential cyber security alerts threats are provided. A method includes receiving logs related to security alerts from multiple sources, the security alerts representing potential cyber security threats in a compute domain; and performing an automated investigation procedure configured to determine whether the logs represent actual cyber security threats, the automated investigation procedure including a plan generation stage in which high-level logical steps are planned for analyzing the logs and retrieving evidences for proving it either malicious or benign, a log comprehension stage in which details of the logs are analyzed to obtain observations of the logs, a plan execution stage in which the steps of the plan generation stage are executed with respect to the observations of the logs, a reasoning stage to conclude the case, and a re-planning stage to generate a new investigation plan for newly discovered entities or signal.

20 Claims, 14 Drawing Sheets

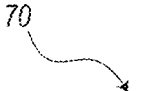
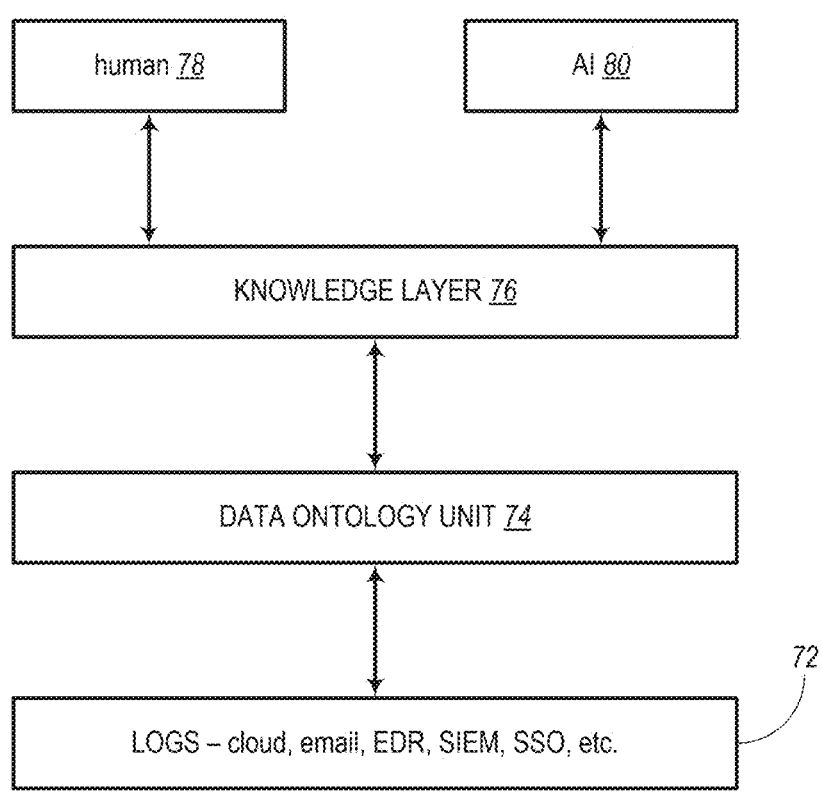
FIG. 5

Reconnaissance
10 techniques

| |
|---|
| Active Scanning (3) |
| Gather Victim Host Information (4) |
| Gather Victim Identity Information (3) |
| Gather Victim Network Information (6) |
| Gather Victim Org Information (4) |
| Phishing for Information (4) |
| Search Closed Sources (2) |
| Search Open Technical Databases (5) |
| Search Open Websites/Domains (3) |
| Search Victim-Owned Websites |

Resource Development
8 techniques

| |
|---|
| Acquire Access |
| Acquire Infrastructure (8) |
| Compromise Accounts (3) |
| Compromise Infrastructure (8) |
| Develop Capabilities (4) |
| Establish Accounts (3) |
| Obtain Capabilities (7) |
| Stage Capabilities (6) |

Initial Access
10 techniques

| |
|---|
| Content Injection |
| Drive-by Compromise |
| Exploit Public-Facing Application |
| External Remote Services |
| Hardware Additions |
| Phishing (4) |
| Replication Through Removable Media |
| Supply Chain Compromise (3) |
| Trusted Relationship |
| Valid Accounts (4) |

Execution
14 techniques

| |
|---|
| Cloud Administration Command |
| Command and Scripting Interpreter (10) |
| Container Administration Command |
| Deploy Container |
| Exploitation for Client Execution |
| Inter-Process Communication (3) |
| Native API |
| Scheduled Task/Job (5) |
| Serverless Execution |
| Shared Modules |
| Software Deployment Tools |
| System Services (2) |
| User Execution (3) |
| Windows Management Instrumentation |

FIG. 6A

| Persistence 20 techniques | Privilege Escalation 14 techniques |
|---|---|
| Account Manipulation (6) | Abuse Elevation Control Mechanism (6) |
| BITS Jobs | Access Token Manipulation (5) |
| Boot or Logon Autostart Execution (14) | Account Manipulation (6) |
| Boot or Logon Initialization Scripts (5) | Boot or Logon Autostart Execution (14) |
| Browser Extensions | Boot or Logon Initialization Scripts (5) |
| Compromise Host Software Binary | Create or Modify System Process (5) |
| Create Account (3) | Domain or Tenant Policy Modification (2) |
| Create or Modify System Process (5) | Escape to Host |
| Event Triggered Execution (16) | Event Triggered Execution (16) |
| External Remote Services | Exploitation for Privilege Escalation |
| Hijack Execution Flow (13) | Hijack Execution Flow (13) |
| Implant Internal Image | Process Injection (12) |
| Modify Authentication Process (9) | Scheduled Task/Job (5) |
| Office Application Startup (6) | Valid Accounts (4) |
| Power Settings | |
| Pre-OS Boot (5) | |
| Scheduled Task/Job (5) | |
| Server Software Component (6) | |
| Traffic Signaling (2) | |
| Valid Accounts (4) | |

FIG. 6B

| Privilege Escalation 14 techniques | Defense Evasion 43 techniques |
|---|---|
| Abuse Elevation Control Mechanism (5) | Abuse Elevation Control Mechanism (5) |
| Access Token Manipulation (5) | Access Token Manipulation (5) |
| Account Manipulation (6) | BITS Jobs |
| Boot or Logon Autostart Execution (14) | Build Image on Host |
| Boot or Logon Initialization Scripts (5) | Debugger Evasion |
| Create or Modify System Process (5) | Deobfuscate/Decode Files or Information |
| Domain or Tenant Policy Modification (2) | Deploy Container |
| Escape to Host | Direct Volume Access |
| Event Triggered Execution (16) | Domain or Tenant Policy Modification (2) |
| Exploitation for Privilege Escalation | Execution Guardrails (1) |
| Hijack Execution Flow (13) | Exploitation for Defense Evasion |
| Process Injection (12) | File and Directory Permissions Modification (2) |
| Scheduled Task/Job (5) | Hide Artifacts (12) |
| Valid Accounts (4) | Hijack Execution Flow (13) |
| | Impair Defenses (11) |
| | Impersonation |
| | Indicator Removal (9) |
| | Indirect Command Execution |
| | Masquerading (9) |
| | Modify Authentication Process (9) |
| | Modify Cloud Compute Infrastructure (5) |
| | Modify Registry |
| | Modify System Image (2) |
| | Network Boundary Bridging (1) |
| | Obfuscated Files or Information (13) |
| | Plist File Modification |
| | Pre-OS Boot (5) |
| | Process Injection (12) |
| | Reflective Code Loading |
| | Rogue Domain Controller |
| | Rootkit |

FIG. 6C

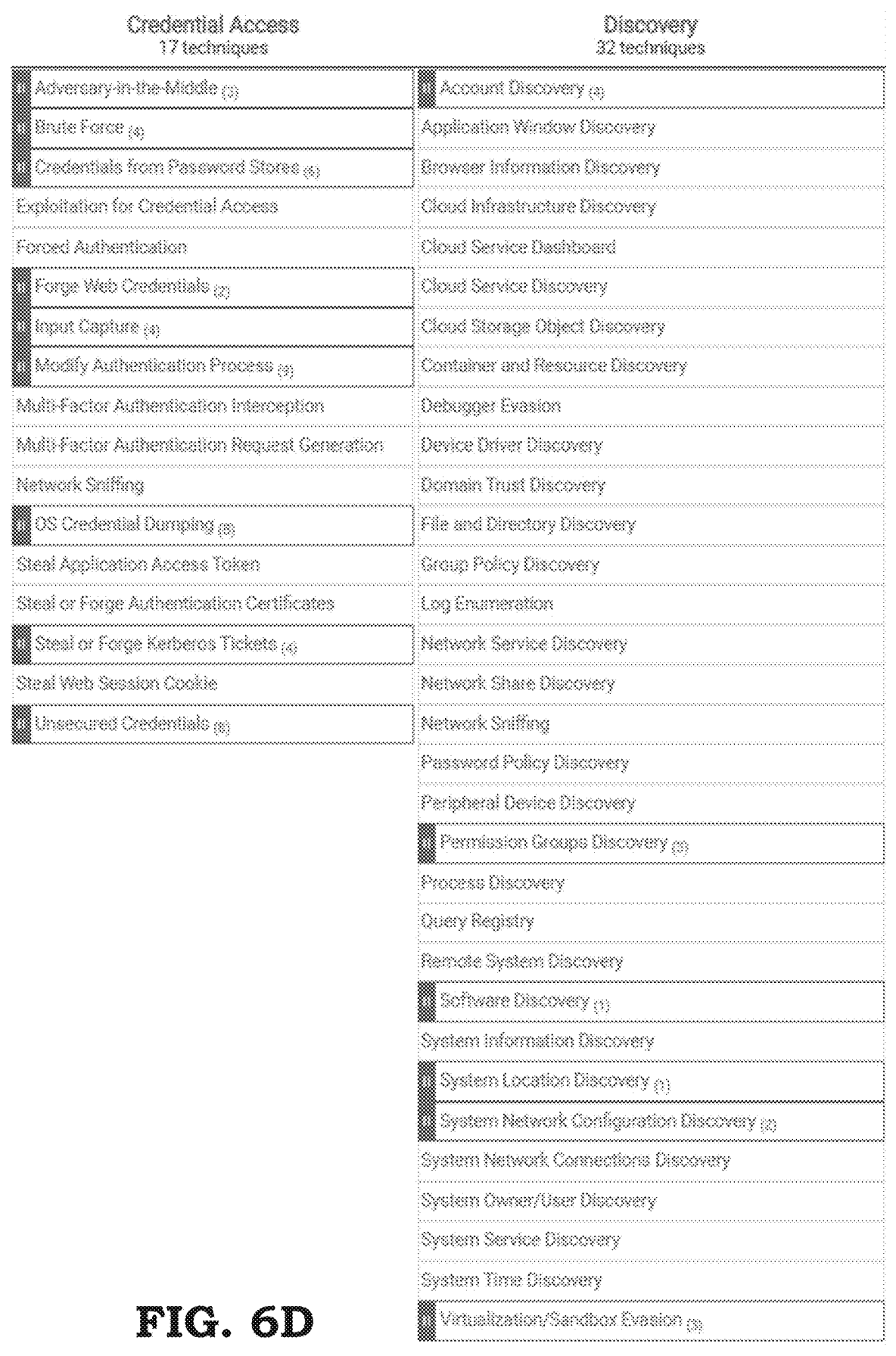

| Credential Access<br>17 techniques | Discovery<br>32 techniques |
|---|---|
| Adversary-in-the-Middle (3) | Account Discovery (4) |
| Brute Force (4) | Application Window Discovery |
| Credentials from Password Stores (6) | Browser Information Discovery |
| Exploitation for Credential Access | Cloud Infrastructure Discovery |
| Forced Authentication | Cloud Service Dashboard |
| Forge Web Credentials (2) | Cloud Service Discovery |
| Input Capture (4) | Cloud Storage Object Discovery |
| Modify Authentication Process (8) | Container and Resource Discovery |
| Multi-Factor Authentication Interception | Debugger Evasion |
| Multi-Factor Authentication Request Generation | Device Driver Discovery |
| Network Sniffing | Domain Trust Discovery |
| OS Credential Dumping (8) | File and Directory Discovery |
| Steal Application Access Token | Group Policy Discovery |
| Steal or Forge Authentication Certificates | Log Enumeration |
| Steal or Forge Kerberos Tickets (4) | Network Service Discovery |
| Steal Web Session Cookie | Network Share Discovery |
| Unsecured Credentials (8) | Network Sniffing |
| | Password Policy Discovery |
| | Peripheral Device Discovery |
| | Permission Groups Discovery (3) |
| | Process Discovery |
| | Query Registry |
| | Remote System Discovery |
| | Software Discovery (1) |
| | System Information Discovery |
| | System Location Discovery (1) |
| | System Network Configuration Discovery (2) |
| | System Network Connections Discovery |
| | System Owner/User Discovery |
| | System Service Discovery |
| | System Time Discovery |
| | Virtualization/Sandbox Evasion (3) |

FIG. 6D

| Collection<br>17 techniques | Command and Control<br>18 techniques |
|---|---|
| Adversary-in-the-Middle (3) | Application Layer Protocol (4) |
| Archive Collected Data (3) | Communication Through Removable Media |
| Audio Capture | Content Injection |
| Automated Collection | Data Encoding (2) |
| Browser Session Hijacking | Data Obfuscation (3) |
| Clipboard Data | Dynamic Resolution (3) |
| Data from Cloud Storage | Encrypted Channel (2) |
| Data from Configuration Repository (2) | Fallback Channels |
| Data from Information Repositories (3) | Hide Infrastructure |
| Data from Local System | Ingress Tool Transfer |
| Data from Network Shared Drive | Multi-Stage Channels |
| Data from Removable Media | Non-Application Layer Protocol |
| Data Staged (2) | Non-Standard Port |
| Email Collection (3) | Protocol Tunneling |
| Input Capture (4) | Proxy (4) |
| Screen Capture | Remote Access Software |
| Video Capture | Traffic Signaling (2) |
| | Web Service (3) |

FIG. 6E

| Exfiltration 9 techniques | Impact 14 techniques |
|---|---|
| Automated Exfiltration (1) | Account Access Removal |
| Data Transfer Size Limits | Data Destruction |
| Exfiltration Over Alternative Protocol (3) | Data Encrypted for Impact |
| Exfiltration Over C2 Channel | Data Manipulation (3) |
| Exfiltration Over Other Network Medium (1) | Defacement (2) |
| Exfiltration Over Physical Medium (1) | Disk Wipe (3) |
| Exfiltration Over Web Service (4) | Endpoint Denial of Service (4) |
| Scheduled Transfer | Financial Theft |
| Transfer Data to Cloud Account | Firmware Corruption |
| | Inhibit System Recovery |
| | Network Denial of Service (2) |
| | Resource Hijacking |
| | Service Stop |
| | System Shutdown/Reboot |

FIG. 6F

| CHARACTERISTICS | CONVENTIONAL SOAR PLAYBOOK | SECURITY THREAT INVESTIGATION OF THE PRESENT DISCLOSURE |
|---|---|---|
| Code | Assembly Code | Object-Oriented Programming |
| Level of Abstraction | Low | High |
| Reusability | Low | High |
| Complexity | High | Low |
| Development Time | Slow | Fast |

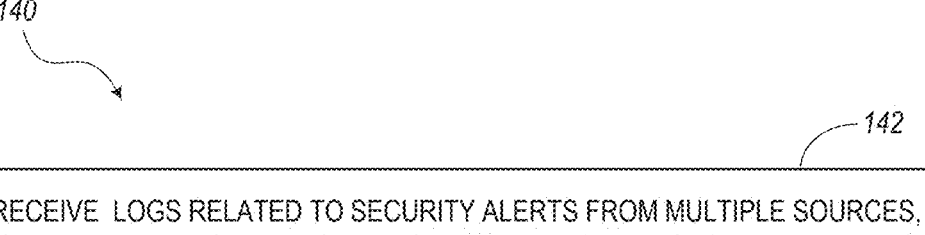

140

142

RECEIVE LOGS RELATED TO SECURITY ALERTS FROM MULTIPLE SOURCES, THE SECURITY ALERTS REPRESENTING POTENTIAL CYBER SECURITY THREATS IN A COMPUTE DOMAIN

144

PERFORM AN AUTOMATED INVESTIGATION PROCEDURE CONFIGURED TO DETERMINE WHETHER THE LOGS REPRESENT ACTUAL CYBER SECURITY THREATS, THE AUTOMATED INVESTIGATION PROCEDURE INCLUDING
    A PLAN GENERATION STAGE IN WHICH HIGH-LEVEL LOGICAL STEPS ARE PLANNED FOR ANALYZING THE LOGS AND RETRIEVING EVIDENCES FOR PROVING IT EITHER MALICIOUS OR BENIGN,
    A LOG COMPREHENSION STAGE IN WHICH DETAILS OF THE LOGS ARE ANALYZED TO OBTAIN OBSERVATIONS OF THE LOGS FOR A CASE,
    A PLAN EXECUTION STAGE IN WHICH THE HIGH-LEVEL LOGICAL STEPS OF THE PLAN GENERATION STAGE ARE EXECUTED WITH RESPECT TO THE OBSERVATIONS OF THE LOGS,
    A REASONING STAGE TO CONCLUDE THE CASE AS MALICIOUS OR BENIGN, AND
    A RE-PLANNING STAGE TO GENERATE A NEW INVESTIGATION PLAN FOR NEWLY DISCOVERED ENTITIES OR SIGNALS OF THE CASE OR A NEW CASE

FIG. 9

AUTOMATICALLY INVESTIGATING SECURITY ALERTS FOR SECURITY OPERATIONS CENTER (SOC)

TECHNICAL FIELD

The present disclosure generally relates to compute domains, such as compute, network, cloud, Single Sign On (SSO), security data lake, and any other system that can generate alerts and logs. More particularly, the present disclosure relates to a Security Operations Center (SOC) configured to automatically investigate security alerts from data logs obtained in compute domains using Machine Learning (ML) and Artificial Intelligence (AI) techniques.

BACKGROUND

Cyber security attacks are responsible for disrupting normal business flow and creating a significant financial burden for many companies. Various tools are available for detecting and responding to different types of security threats to mitigate the negative impacts that attacks can have on an organization. Generally, a Security Operations Center (SOC) normally focuses on security operations and security device management. In addition, a SOC may also perform threat and vulnerability management, compute domain monitoring, and incident reporting. Usually, a SOC includes security software as well as a team of security experts. In the field of security management, Security Information and Event Management (SIEM) is a technology that involves a standardized consumption of log data from multiple security tools throughout compute domains to monitor security threats. Generally, examining log data to determine threats, vulnerabilities, remediation, etc. is a complex task, requiring domain expertise. This problem is further exacerbated with cloud logs which tend to be more complex as well as dependent on the cloud provider. As cyber security is critical, there is a need to effectively analyze logs across different compute domains, including but not limited to endpoint, network, cloud, email, single-sign-on (SSO), security data lake, or anything that can generate alerts and logs, to identify threats, vulnerabilities, and for remediation.

BRIEF SUMMARY

The present disclosure is directed to Security Operations Center (SOCs) and other security management systems for triaging security alerts and stopping attacks early. According to one implementation, a method for automatically investigating security alerts includes a step of receiving logs related to security alerts from multiple sources within compute domains being monitored, wherein the security alerts represent potential cyber security threats in the compute domains. The method further includes a step of performing an automated investigation procedure configured to determine whether the logs represent actual cyber security threats. For example, the automated investigation procedure includes a) a plan generation stage in which high-level logical steps are planned for finding evidences to prove it either malicious or benign, b) a log comprehension stage in which details of the logs are analyzed to obtain evidences from the logs, c) a plan execution stage in which the logical steps of the plan generation stage are executed with respect to the observations of the logs, and d) a reasoning stage to conclude the case, and (e) a re-planning stage to generate a new investigation plan for newly discovered entities or signal.

According to some embodiments, the plan generation stage is configured to receive planning assistance from a neural-symbolic AI model including a Large Language Model (LLM). The plan generation stage may further be configured to receive planning assistance from a security expert knowledge, wherein the security expert knowledge is provided by a security team or auto-acquired by (1) learning from humans' past investigation stored in case management system, (2) learning from past live feedback, or (3) learning from provided textbooks.

The security expert knowledge is (1) encoded as plain texts and used via Retrieval Augmented Generation (RAG) in the LLM or (2) encoded as a knowledge graph and leveraged by the neural-symbolic AI model. The plan generation stage involves logic-based abductive reasoning, and wherein the logic-based abductive reasoning for reversely inferring potential root causes of suspicious activities observed in the security alerts. Also, the plan generation stage may involve creating and editing a cyber security response playbook that is executed during the plan execution stage.

The log comprehension stage, in some implementations, may also include comprehension assistance from generative AI models trained specifically from sequences of events from one or more compute domains. The log comprehension stage may also include a step of performing an unsupervised learning procedure on the logs to obtain a knowledge layer about the intent of the user activities.

In some embodiments, the plan execution stage may include includes executing a variety of different actions, wherein the variety of different actions include (1) a step of presenting auto-generated predefined questions to one or more end users regarding the potential cyber security threats;

(2) a step of auto translating a natural language question to database queries or Application Programming Interface (API) calls;

(3) a step of retrieving answers to investigation questions specified in the plan generation stage using institutional knowledge specific to each company, where the institutional knowledge is via Retrieval Augmented Generation (RAG) in a Large Language Model (LLM).

The automated investigation procedure, in some implementations, the re-planning stage involves generating a new investigation plan for entities or signals discovered from an earlier plan execution stage. The automated investigation procedure, in some implementations, may further include a report generation and reasoning stage in which results of executing the logical steps of the plan generation stage are provided to a security team. For instance, the evidences may be obtained using Machine Learning (ML) models by measuring or testing email systems, cloud systems, Security Information and Event Management (SIEM) systems, Endpoint Detection and Response (EDR) systems, Network Detection and Response (NDR) systems, Managed Detection and Response (MDR) systems, Extended Detection and Response (XDR) systems, identity detection systems, and deception detection systems of the compute domains. The method may be executed, for example, by a Security Operations Center (SOC) in communication with the compute domains.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 5 is a diagram illustrating modules of a log comprehension system, according to various embodiments.

FIGS. 6A-6F are a diagram illustrating examples of security attack lifecycles of different attacks.

FIG. 8 is a table comparing characteristics of the SOAR playbook described with respect to FIG. 7 with characteristics of embodiments of log investigation procedures described in the present disclosure.

FIG. 9 is a flow diagram illustrating a method for automatically investigating security alerts, according to various embodiments of the present disclosure.

DETAILED DESCRIPTION

Figure 1:
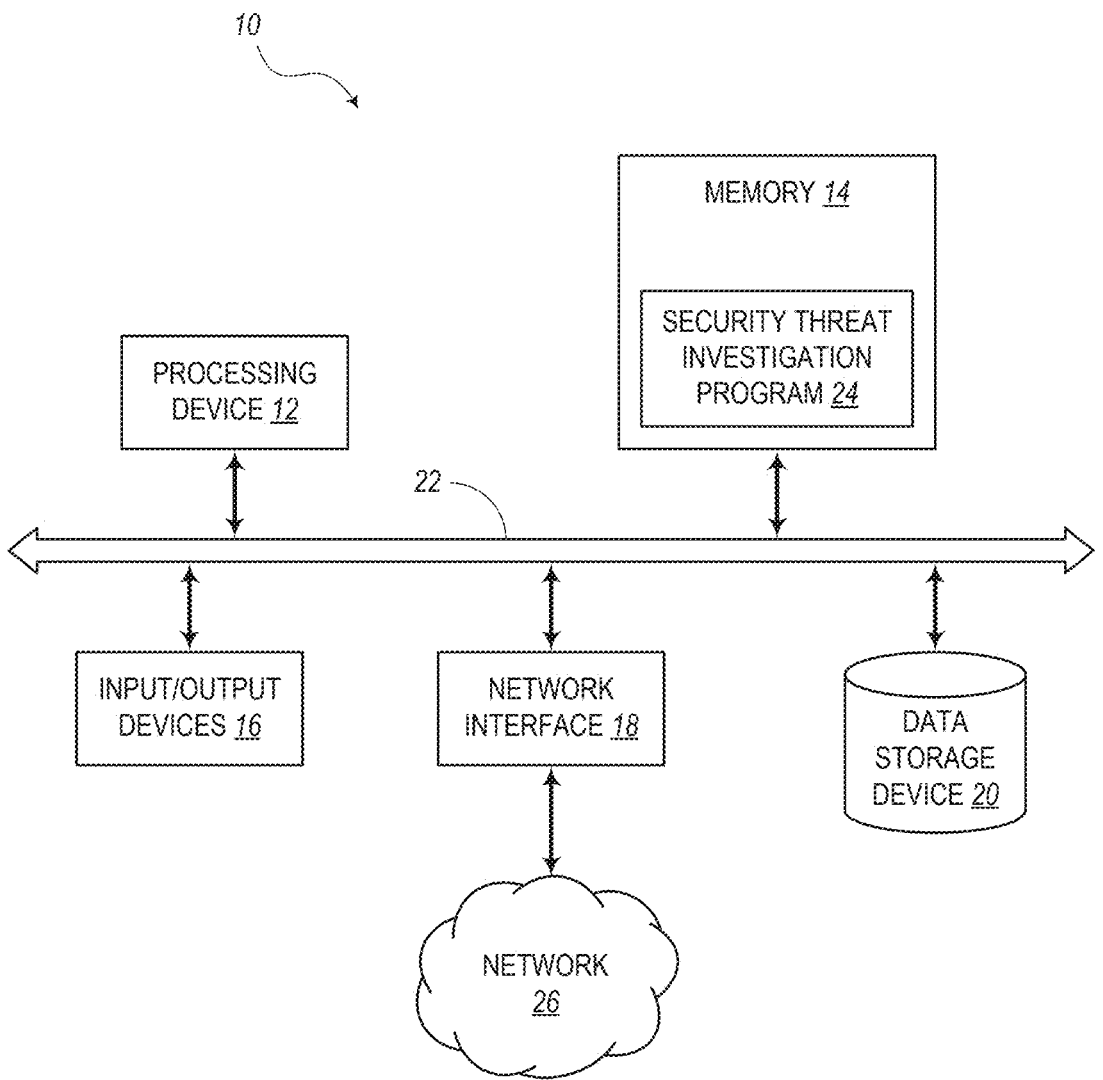
FIG. 1 is a block diagram illustrating a computing system of a Security Operations Center (SOC), according to various embodiments of the present disclosure.

The present disclosure relates to systems and methods for obtaining logs from compute domains, wherein the logs are related to the detection of potential security threats at various locations throughout the compute domains. More specifically, these logs are then analyzed or investigated, using both computing resources (e.g., computers, Machine Learning (ML) models, Large Language Models (LLMs), etc.) as well as human resources (e.g., security management teams, IT professionals, network operators, technicians, etc.).

A strategy or technique for handling security threats can be defined in a "security playbook" or "cyber security response playbook." The security playbook outlines a plan of actions that can be taken in the event of a security incident. Playbooks are normally a key component of cybersecurity, IT incident management, DevOps, etc. Also, these playbook may include standard procedures and steps for responding to security incidents in real time and may also include training instructions for presenting or demonstrating how new team members are expected to respond to future security threats. Also, it should be noted that playbooks may include procedures that are automatically or manually instantiated. According to the embodiments of the present disclosure, Machine Learning (ML) models and Large Language Models (LLMs) are used in a way that replaces many of the tedious manual tasks with automated procedures.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Computing System of a Security Operations Center (SOC)

FIG. 1 is a block diagram illustrating an embodiment of a computer system 10 that may be used in a Security Operations Center (SOC) for investigating security threats in compute domains. For example, the SOC may be implemented via one or more servers in a cloud-based facility that is configured to assist one or more organizations with cyber security monitoring in a security-as-a-service role. In other embodiments, the SOC may be incorporated within the compute domains of a specific organization (e.g., business, enterprise, university, etc.) for monitoring security threats on-premises. In still other embodiments, the SOC may be arranged between an organization's domain and the Internet to provide security services to the organization in a firewall-type role. For example, the SOC may have inline service functionality and operate as a Secure Internet system or Web Gateway system.

As shown in FIG. 1, the computer system 10 may be a digital computing device that generally includes a processing device 12, memory 14, input/output (I/O) devices 16, a network interface 18, and a data storage device 20 base. It should be appreciated that FIG. 1 depicts the computer system 10 in a simplified manner, where some embodiments may include additional components and suitably configured processing logic to support known or conventional operating features. The components (i.e., 12, 14, 16, 18, 20) may be communicatively coupled via a local interface 22 or bus interface. The local interface 22 may include, for example, one or more buses or other wired or wireless connections.

The computer system 10 may be utilized in various embodiments of the present disclosure having one or more Central Processing Units (CPUs) and/or other processing devices, which may be implemented as one or more microprocessors, controllers, or other computational units capable of executing instructions. For example, the processing device 12 may operate in conjunction with memory components, such as memory 14, which may include volatile memory (e.g., Random Access Memory (RAM)) and non-volatile memory (e.g., Read-Only Memory (ROM), flash memory, or other persistent storage mediums). The memory 14 can store both program instructions and data necessary for the operation of the computer system 10 and execution of the functionality described in the present disclosure.

In addition to the processing device 12 and memory 14, the computer system is equipped with a variety of input/output (I/O) devices to facilitate interaction with users and other external systems. These I/O devices may include keyboards, pointing devices (e.g., mice, touchpads), displays (e.g., monitors, screens), printers, scanners, speakers, microphones, cameras, and other peripherals. The computer system further includes interfaces and drivers to enable communication and data exchange between the processing device and the various I/O devices.

Furthermore, the computer system 10 is equipped with a network interface 18 or network adapter that enables connectivity to one or more networks (e.g., network 26), such as local area networks (LANs), wide area networks (WANs), the Internet, or other communication networks. The network interface 18 may utilize wired or wireless communication protocols and hardware (e.g., Ethernet, Wi-Fi, Bluetooth, etc.) to facilitate data transmission and reception with other devices and systems.

The computer system 10 also incorporates a data storage device 20 (e.g., database, data store, database management system, database engine, etc.) for storing, organizing, and managing data relevant to the embodiments of the present disclosure. The data storage device 20 may utilize various data storage technologies and structures (e.g., relational databases, NoSQL databases, etc.) to efficiently store and retrieve data in accordance with the requirements of the present embodiments.

Additionally, the computer system 10 includes a local interface 22 (e.g., bus architecture, bus interface, etc.) that facilitates communication and data transfer between the processing device 12, memory 14, I/O devices 16, network interface 18, data storage device 20, and other system components. The local interface 22 may employ standard bus protocols (e.g., PCI, USB, etc.) to enable seamless integration and interoperability between various hardware components and peripherals within the computer system 10.

In operation, the processing device 12 may execute program instructions stored in memory 14, interact with input/output devices 16 for user interaction and data exchange, communicate over the network interface 18 for remote access and data transfer, access and manipulate data stored in the data storage device 20, and utilize the bus interface to coordinate communication and data transfer between different components of the computer system 10. These components collectively enable the computer system 10 to implement the functionality of the embodiments of the present disclosure and perform the tasks described herein.

In particular, the computer system 10 may include a security threat investigation program 24, which may be implemented in any suitable form of hardware (e.g., in the processing device 12) and/or software or firmware (e.g., in the memory 14). The security threat investigation program 24 may be configured to obtain logs of potential security issues or vulnerabilities from various sources in compute domains. Also, the security threat investigation program 24 is configured to process these logs to generate a security plan (e.g., playbook), which can be generated, edited, etc. with the help of an LLM and/or one or more security team members. Next, the security threat investigation program 24 may be configured to perform a log comprehension procedure, which may be executed primarily by an LLM or other ML-based models. The security threat investigation program 24 may also engage the help from one or more users to clarify various issues as needed. Then, the security threat investigation program 24 may be configured to execute the security plan, which may also involve an LLM, and then report the results to a security team, network operator, etc.

While FIG. 1 illustrates a single computer system 10, those skilled in the art will recognize the SOC contemplates implementation in various different approaches. Generally, in all approaches, there will be one or more physical computer systems 10 ultimately executing the SOC and the security threat investigation program 24. In some embodiments, the security threat investigation program 24 can be implemented in Virtual Machines (VMs), software containers, software dockers, and the like. In some embodiments, the security threat investigation program 24 and the SOC may be realized as a cloud service, such as in a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, application, or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud."

Security Log Management System

Figure 2:
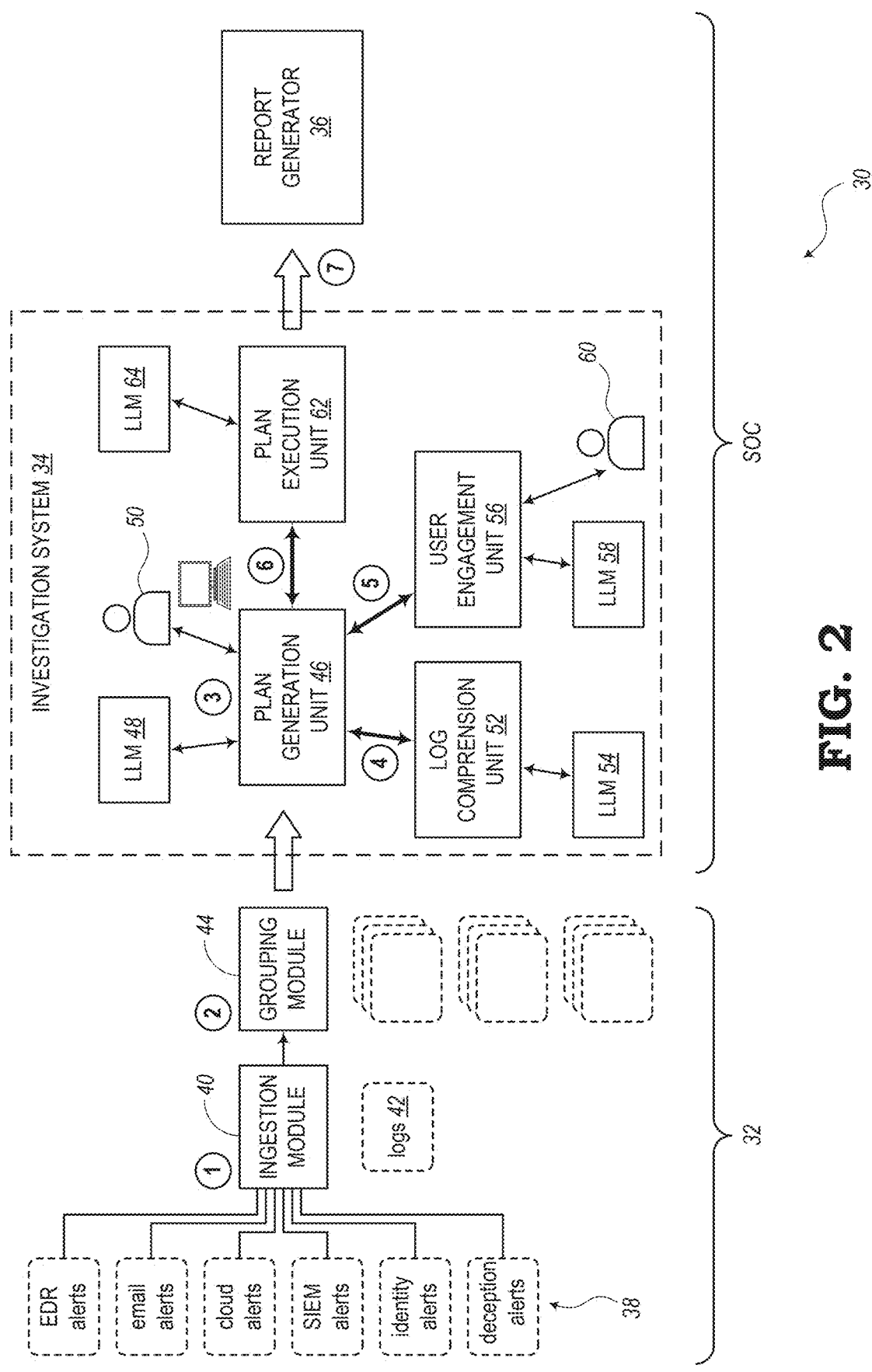
FIG. 2 is a block diagram illustrating a security log management system, according to various embodiments.

FIG. 2 is a block diagram illustrating an embodiment of a security log management system 30. As shown in FIG. 2, the security log management system 30 generally includes a compute domain 32 being monitored and the SOC (or computer system 10) shown in FIG. 1. The SOC, in this embodiment, includes an investigation system 34 and a report generator 36. The investigation system 34, for example, is configured to investigate logs obtained from the compute domain 32 to process potential security threats in the compute domain 32. The report generator 36 is configured to report results of the log investigation procedures for providing information about discovered security issues, context of the security issues, possible mitigation solutions, charts, tables, graphs, summarizations, etc.

The compute domain 32 may include self-monitoring devices, telemetry components, etc. for detecting potential security issues or alerts 38. The alerts 38 may be detected at various locations within the compute domains by any suitable number of sources. For example, the alerts 38 may include EDR alerts, email alerts, cloud alerts, SIEM alerts, identity alerts, deception alerts, among others. The alerts 38 are fed to an ingestion module 40, which is configured, in a first stage, for creating logs 42 in a predetermined format. For example, the logs 42 may be recorded with specific information, such as event time, event name, identity of security detection component, identity of network component (e.g., IP address), corresponding user agent, etc. In a second stage, a grouping module 44 may be configured to obtain the logs 42 and group them according to specific categories (e.g., types of security alerts, types of network components associated with the alerts, malicious alerts, benign alerts, etc.). At this point, the logs (or groups of logs) are provided to the SOC for processing the logs.

As shown in FIG. 2, the investigation system 34 of the SOC includes a plan generation unit 46, which is configured to receive the logs from the compute domain 32. In a third stage, the plan generation unit 46 is configured to involve the assistance of a neural-symbolic AI model involving the first LLM 48 for automatically creating a plan (e.g., playbook) for investigating the logs. Also, the plan generation unit 46 may involve the assistance of one or more security team members 50 for resolving planning issues that may be germane to the specific compute domain 32 and/or that require human intervention. In some embodiments, various plan generation steps may include logical reasoning, such as abductive reasoning, described in FIGS. 3 and 4, and may be performed automatically by the LLM 48.

Upon generation of a security management plan or security playbook, a log comprehension unit 52 of the investigation system 34 may be used in a fourth stage. At this point, the log comprehension unit 52 may involve the assistance of another LLM 54 for automatically comprehending the security threat logs. For example, in some cases, a Level One (L1) security team member having little experience may be employed to perform tasks that are time-consuming and tedious. The LLM 54 in this scenario may be configured to perform log comprehension steps that might normally be performed by a L1 employee. In some embodiments, log comprehension activities may include data ontology procedures as described with respect to FIG. 5.

Next, in a fifth stage, the investigation system 34 further includes a user engagement unit 56, which may be assisted by another LLM 58 and/or a specific user 60, who may be recognized as having a particular presence as an end user (or someone affiliated with a certain end user) in the compute domain 32. The user engagement unit 56 may therefore be configured to provide help with the plan generation procedure to obtain explanations, verifications, or other types of feedback regarding unusual logs, which may be the result of an employee changing offices, working remotely, utilizing a public Wi-Fi hotspot, uploading new software, employing a new computer, etc. In some cases, the user engagement may include asking a simple question to a supervisor of an employee, such as, "Is Hudson still working from the remote office in Spain?"

After the generation of a security plan, comprehending of logs, and user engagement, the investigation system 34 further includes a plan execution unit 62, which is configured to automatically execute the plan or playbook according to a sixth stage. The plan execution unit 62 may also employ the assistance of an LLM 64. Once the plan is executed and the logs are analyzed with respect to whether or not they truly are representative of a real security threat, the results can be communicated to the report generator 36 (i.e., stage seven), which can provide a report in any suitable form to the security team, executives, administrators, network operators, technicians, etc., as needed, to decide how the security issues should be handled at this point. In some cases, the organization may wish to perform automated remediation or mitigation steps to resolve the security issues. In other cases, the organization may wish to perform manual steps to resolve the issues.

In a sense, it may be noted that IT operations (IT Ops) can be moved to the cloud. Thus, the security (IT) team may be configured to utilize the computer system 10 of the SOC to monitor security threats in the compute domain 32 of an organization. Generally, cloud logs are complex and require expertise in IT or security to review and determine problems, anomalies, etc. One focus in the embodiments of the present disclosure, therefore, is to utilize ML-based procedures, such as LLMs, which can be exceptionally effective at performing the tedious tasks of sifting through large volumes of logs.

The SOC, in the field of cybersecurity, can use various products, which may be categorized as a) Managed Detection and Response (MDR) modules, b) Extended Detection and Response (XDR) modules, c) Endpoint Detection and Response (EDR) modules, d) Network Detection and Response (NDR) modules, etc. Some examples of cloud logs may include logs obtained from various platforms (e.g., Amazon Web Services (AWS), Microsoft Azure, Google Cloud Platform (GCP), etc.).

Abductive Reasoning

Figure 3A:
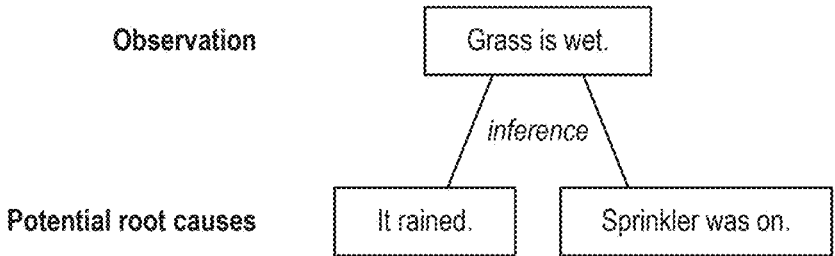
FIG. 3A-3C are diagrams illustrating an example of abductive reasoning.
Figure 3B:
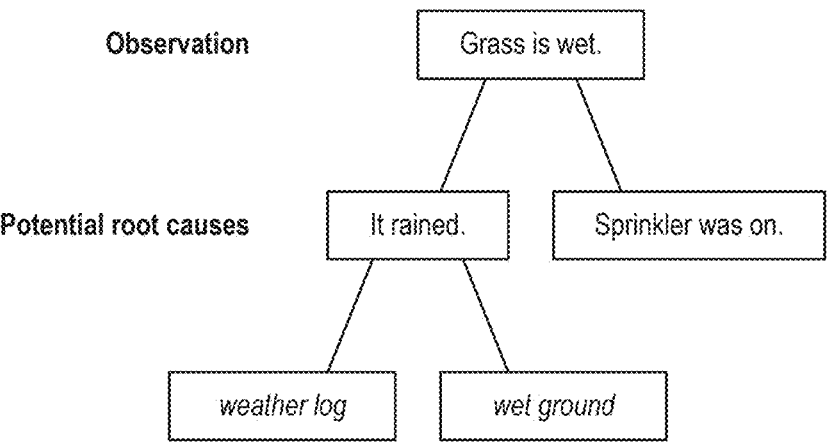
Figure 3C:
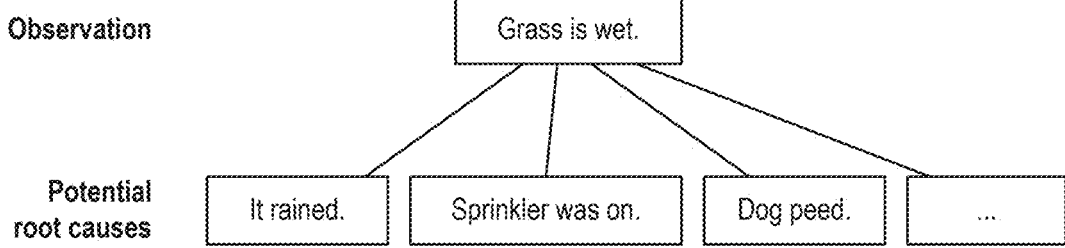

FIG. 3A-3C are diagrams illustrating a textbook example for defining the concept of abductive reasoning, which may also be referred to as abduction, abductive inference, etc. Essentially, abductive reasoning is a form of logical reasoning or logical inference that seeks the simplest and "most likely" conclusion from a set of observations. In this example, the abduction reasoning includes an observation that the "grass is wet." Using inference, it is possible to find the most likely, but not necessarily the most comprehensive, potential root causes of the grass being wet. In the example of FIG. 3A, two potential root causes can be explained as either "it rained" or the "sprinkler was on."

As described in more detail below, the plan generation unit 46 shown in FIG. 2 may use abductive reasoning to automatically and/or manually infer potential root causes of certain logs. Nevertheless, returning to the textbook example, FIG. 3B includes investigation steps related to the potential root cause of "it rained" and look at the weather log to determine if there really was a measurement amount of rainfall in the area and checking the ground in the surrounding areas to see if they really are wet. Suppose, for example, that there was no measured rainfall, the ground in the surrounding areas was not wet, and it was determined that the sprinkler was not turned on. In this case, more investigation is needed to find the real root cause. As suggested in FIG. 3C, suppose that a video recording of the grass in question is checked and it is found that a dog and its owner stopped for a minute to allow the dog to pee. Of course, there may be any number of additional possible (although less likely) root causes of the grass being wet, such as a bunch of kids having a water balloon fight, a person watering plants and leaving a hose on, a street sweeper gone wild, etc.

Figure 4A:
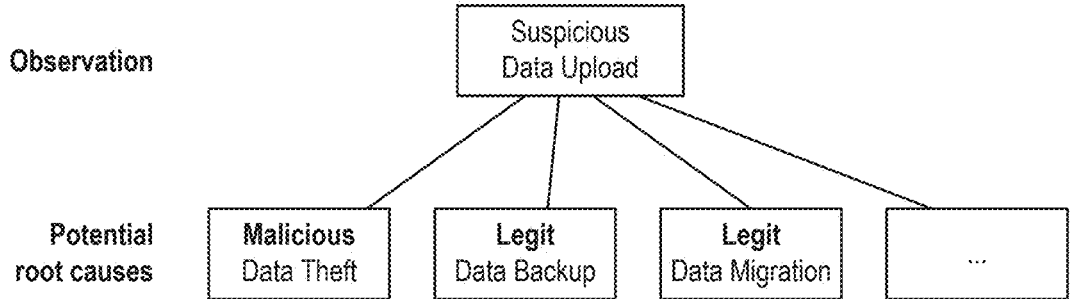
FIG. 4A-4C are diagrams illustrating abductive reasoning procedures for investigating suspicious behavior related to potential cyber security threats, according to various embodiments.
Figure 4B:
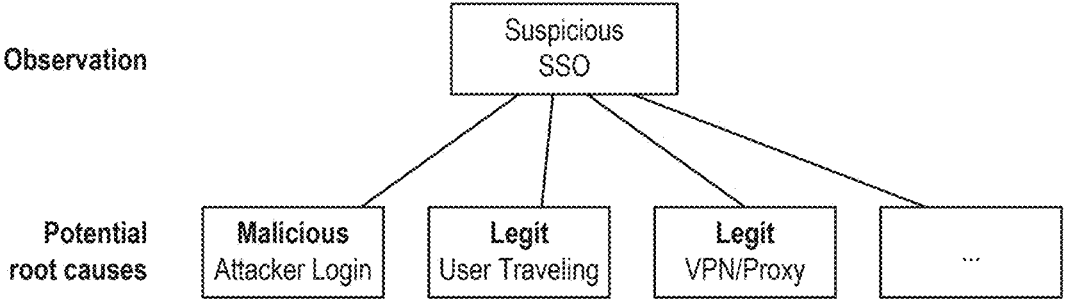
Figure 4C:
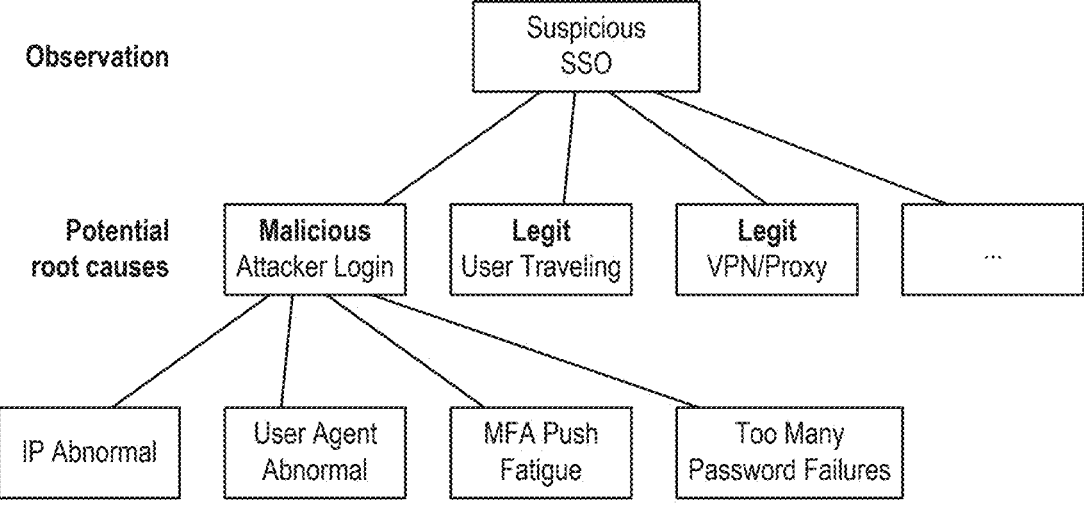

FIG. 4A-4C are diagrams illustrating abductive reasoning procedures for investigating suspicious behavior related to potential cyber security threats. As shown in FIG. 4A, reviewing the security logs may result in an observation that there is a "suspicious data upload" in the compute domain. From this observation, several likely root causes may be inferred. In one case, a potential root cause may represent malicious activity where data theft is involved. In other cases, the potent root causes may represent benign or legit activities, such as a data backup operation or a data migration operation.

In FIG. 4B, the logs may reveal another observation that there was a suspicious Single Sign-On (SSO) action. From this observation, several potential root causes may be inferred. For example, the suspicious SSO action may be the result of a malicious attacker login, a legit user traveling and logging in using unrecognized equipment, a legit VPN or proxy login action.

In FIG. 4C, the malicious attacker login shown in FIG. 4B is further investigated. In this case, some details may be observed about the login, such as an IP address was abnormal, a user agent was abnormal, a Multi-Factor Authentication (MFA) push fatigue attack, or too many password failure attempts.

Log Comprehension

FIG. 5 is a diagram illustrating an embodiment of a log comprehension system 70, which may include components or modules of the log comprehension unit 52 shown in FIG. 2. As illustrated, the log comprehension system 70 obtains logs 72 (e.g., logs 42) from various sources in a compute domain. The logs 72 may include cloud logs, email logs, EDR logs SIEM logs, SSO logs, among others.

The log comprehension system 70 further includes a data ontology unit 74. For instance, the data ontology unit 74 may be configured to link data regarding the various logs 72 in any suitable manner, which may be based on certain classification concepts. The data ontology unit 74 may link, group, and/or organize similar security threat events together using ML models (e.g., LLM 54). In some embodiments, the data ontology unit 74 may use a relational database associated with the LLM 54 to find links. The data ontology unit 74 may represent knowledge of specific details in the logs 72 to define various aspects of the logs 72, such as type, classification, parameters, relationships, constraints, etc. in a structured and organized fashion, to thereby provide a systematic framework for understanding and categorizing the logs 72 and their interconnections.

Furthermore, the log comprehension system 70 includes a knowledge layer 76, which may include the data, metadata, and linking (relational) information of the logs determined by the data ontology unit 74. The knowledge layer 76 may be viewed and/or modified by a human 78 and/or AI 80 based on various knowledge, understandings, deductions, etc. of the logs, the associated compute domain, end users, etc.

Security Attack Examples

FIG. 6A-6F are a diagram illustrating examples of security attack lifecycles of different attacks, such as the MITRE ATT&CK framework. A lifecycle of attacker actions is shown, wherein the attack lifecycle in this example includes steps of initial access, recon, privilege escalation, established persistence/maintain presence, defense evasion, and finally complete mission. Each of these steps includes a number of sub-steps. In the MITRE ATT&CK framework, wherein the attack lifecycle in this example includes steps of reconnaissance, resource development, initial access, execution, persistence, privilege escalation, defense evasion, credential access, discovery, lateral movement, collection, command and control, exfiltration, and impact. Again, each of these steps also includes a number of sub-steps. The embodiments of the present disclosure are configured to utilize knowledge of each of the steps and sub-steps in these and other types of attacks for automatically analyzing and comprehending log information that may seem to represent an actual security attack or at least bring up an alert that can be further investigated (automatically or manually).

Differences from Security Orchestration, Automation, and Response (SOAR)

Figure 7:
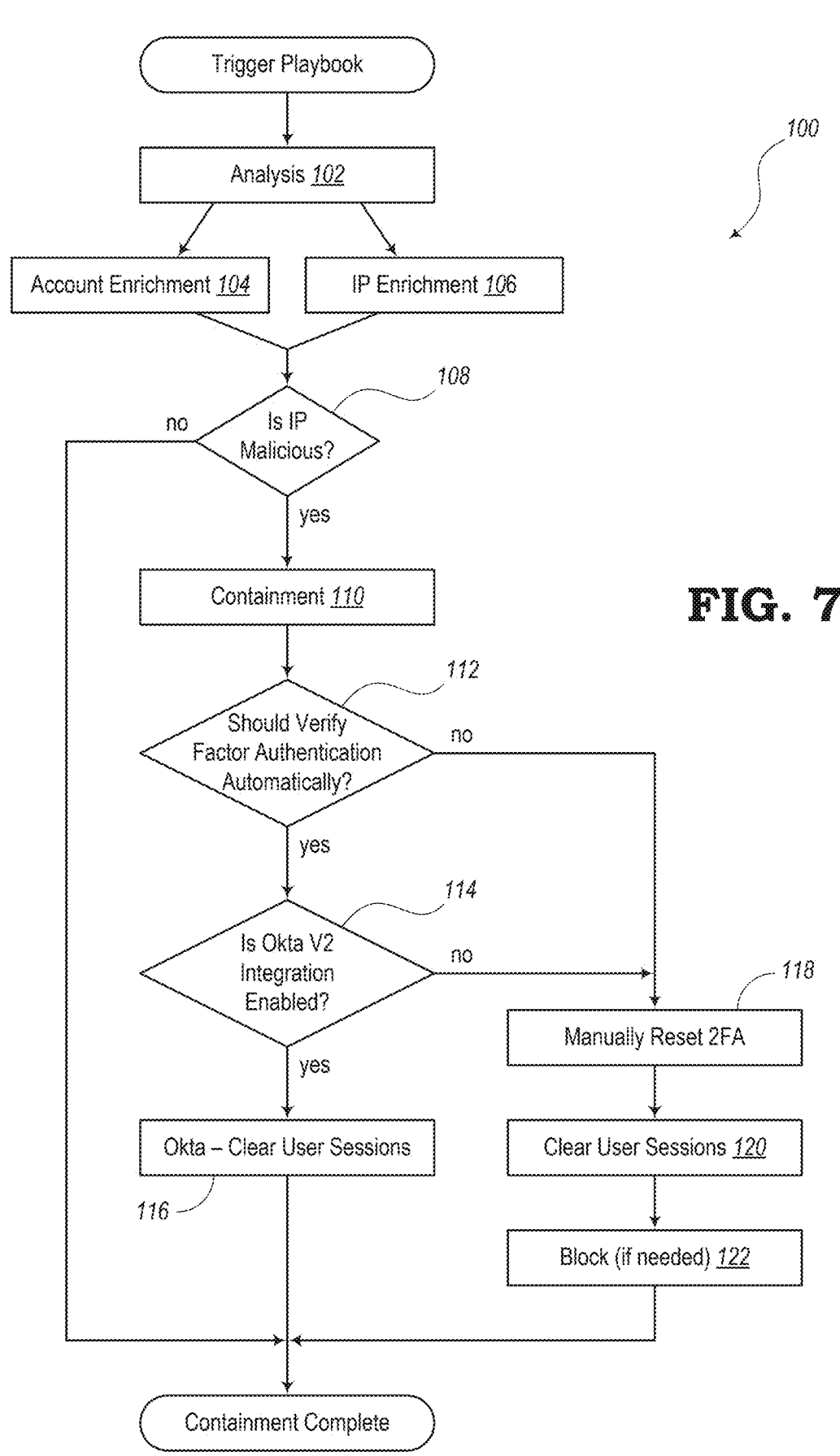
FIG. 7 is a flow diagram illustrating an example of a Security Orchestration, Automation, and Response (SOAR) playbook for managing cyber security threats.

FIG. 7 is a flow diagram illustrating an example of a Security Orchestration, Automation, and Response (SOAR)

playbook 100 for managing cyber security threats. Such fixed playbook was the last generation of solution to automate the alert investigation and response. As shown, when the SOAR playbook 100 is triggered, an analysis step 102 is performed. The SOAR playbook 100 may include account enrichment 104 and/or IP enrichment 106 steps. Next, the SOAR playbook 100 is configured to determine if the IP is malicious, as indicated in condition block 108. If not, the process ends. Otherwise, if IP is found to be malicious, the SOAR playbook 100 goes to block 110, which includes a containment step.

Next, the SOAR playbook 100 includes determining whether a verify factor should be authenticated automatically, as indicated in condition block 112. If not, the SOAR playbook 100 goes to block 118. Otherwise, if the verify factor is to be authenticated automatically, a condition block 114 determines if Okta V2 Integration is enabled. If not, the SOAR playbook 100 proceeds to block 118. Otherwise, Okta clears the user sessions, and the containment is completed. In block 118, the SOAR playbook 100 includes a step of manually resetting 2FA. Also, as indicated in block 120, the SOAR playbook 100 includes a step of clearing the user sessions. Also, the SOAR playbook 100 may include a blocking step (if needed), as indicated in block 122. Then, the SOAR playbook 100 completes containment and ends.

FIG. 8 is a table 130 comparing characteristics of the SOAR playbook described with respect to FIG. 7 with characteristics of embodiments of log investigation procedures (e.g., security threat investigation program 24, investigation system 34, etc.) described in the present disclosure. Compared to conventional SOAR playbooks, the systems and methods of the present disclosure generalize better to unseen threats, as they have a higher level of abstraction, a higher level of reusability, lower complexity, and a faster development time. The difference between traditional SOAR playbooks and the one in the present disclosure is similar to the difference between assembly code vs object-oriented programming languages.

Automated Security Alert Investigation Process

FIG. 9 is a flow diagram illustrating an embodiment of a method 140 for automatically investigating security alerts. As shown in FIG. 9, the method 140 includes a step of receiving logs related to security alerts from multiple sources, the security alerts representing potential cyber security threats in a compute domain, as indicated in block 142. The method 140 further includes a step of performing an automated investigation procedure configured to determine whether the logs represent actual cyber security threats, as indicated in block 144. For example, the automated investigation procedure includes (a) a plan generation stage in which high-level logical steps are planned for analyzing the logs and retrieving evidences for proving it either malicious or benign, (b) a log comprehension stage in which details of the logs are analyzed to obtain observations of the logs for a case, (c) a plan execution stage in which the high-level logical steps of the plan generation stage are executed with respect to the observations of the logs, (d) a reasoning stage to conclude the case as malicious or benign, and (e) a re-planning stage to generate a new investigation plan for newly discovered entities or signals of the case or a new case.

According to some embodiments, the plan generation stage is configured to receive planning assistance from a neural-symbolic AI model including a Large Language Model (LLM). The plan generation stage can further be configured to receive planning assistance from a security expert knowledge, wherein the security expert knowledge is provided by a security team or auto-acquired by (1) learning from humans' past investigation stored in case management system, e.g., Jira tickets, (2) learning from past live feedback such as via feedback from human security analysts on past investigation results, or (3) learning from provided text-books, such as from training bootcamps such as the SANS Institute, Blackhat conferences, etc. The security expert knowledge is (1) encoded as plain texts and used via Retrieval Augmented Generation (RAG) in the LLM or (2) encoded as a knowledge graph and leveraged by the neural-symbolic AI model.

The log comprehension stage, in some implementations, may involve logic-based abductive reasoning, wherein the logic-based abductive reasoning includes deductive reason-ing and inductive reasoning for inferring potential root causes of suspicious activities observed in the security alerts. The log comprehension stage may also include com-prehension assistance from a Large Language Model (LLM) trained specifically for the compute domain. The log com-prehension stage may also include a step of performing an unsupervised learning procedure on the logs to obtain a knowledge layer. First, it trains an unsupervised learning model that clusters the past sessions of user activities, followed by a cluster assignment for the session under investigation. If a similar cluster is found for the session under investigation, then the tags on the cluster provide human readable description of the user activity. The tags are the knowledge provided by security experts.

The plan execution stage can include executing a variety of different actions. The different actions can include (1) a step of presenting auto-generated predefined questions to one or more end users regarding the potential cyber security threats, (2) a step of auto translating a natural language question to database queries or Application Programming Interface (API) calls, or (3) a step of retrieving answers to investigation questions specified in the plan generation stage using institutional knowledge specific to each company, where the institutional knowledge is via Retrieval Aug-mented Generation (RAG) in a Large Language Model (LLM).

In some embodiments, the plan execution stage may include a step of presenting predefined questions to one or more end users regarding the potential cyber security threats. The automated investigation procedure, in some implemen-tations, may further include a report generation stage in which results of executing the logical steps of the plan generation stage are provided to a security team. For instance, the logs are obtained using Machine Learning (ML) models by measuring or testing email systems, cloud systems, Security Information and Event Management (SIEM) systems, Endpoint security tools such as Endpoint Detection and Response (EDR) systems, Antivirus systems, device management systems, Network security tools such as Network Detection and Response (NDR) systems, firewalls, proxies, virtual private network, web applications, secure service access edge (SASE), code development systems such as source code management, continuous integration, and continuous deployment Managed Detection and Response (MDR) systems, Extended Detection and Response (XDR) systems, identity detection systems, and deception detection systems, of the compute domain.

Additional Examples

According to various embodiments of the present disclo-sure, the systems and methods are configured to provide Autonomous Security Operations. The systems and methods are configured to perform investigation procedures, which may have three main functional components:

1) Log comprehension—via a generative AI model com-bining LLM and diffusion model,
2) Plan generation—via a neural-symbolic architecture involving probabilistic abductive reasoning over knowledge graph
3) Plan execution, user interaction and report genera-tion—via LLM In a first Use Case, suppose, for example, that a security investigation is being performed for a company in the technology sector having about 1,000 employees and one cloud security engineer. Also, suppose, in this case, that an alert arises where it is observed that an employee who was terminated a few months ago still has activities on AWS. The investigation may include automatically and manually read-ing logs obtained before and after the termination to under-stand what may have happened. Of course, over the span of several days, there may be thousands of lines or logs of various events. Each line (or log) may include event times, event names, source IP addresses, user devices, etc. In this example, the log comprehension system 70 of FIG. 5 may be used to sift through the multiple lines of data using AI-based techniques (e.g., LLM 54) to determine if the data tends to point to inappropriate behavior on the part of the terminated employee or if there are other explanation for the security event issues, such as the terminated employee contacting the company to retrieve personal information, another employee using old equipment previously used by the terminated ex-employee, etc. Many false alarms can be automatically eliminated by training and utilize the LLM 54.

In a second Use Case, suppose, for example, that a security investigation is being performed for a company in the technology sector having over 1,000 employees and ten security analysts. Also, suppose, in this case, that an alert arises where it is observed that an "iam entity" S3 API exhibits anomalous behavior with respect to a "putObject" command. It may be observed from the past that the user typically uses "getObject," but now he is using "putObject." An investigation may be performed in the scenario to prove whether the alert is malicious or benign, whether a user is guilty or innocent, or other results. The investigation may include the use of Abductive Reasoning to provide a best explanation for the observations. Again, the abductive rea-soning may include both deductive reasoning and inductive reasoning.

The systems and methods of the present disclosure may be incorporated in, performed by, and associated with the computer system 10, security threat investigation program 24, SOC, investigation system 34, method 140, etc. The present disclosure may also include additional features for investigating possible security issues. In one example, the present disclosure may include a way to prioritize or triage logs. In other words, certain security alerts may be consid-ered to be more critical and should be handled before others. Therefore, the plan generation unit 46 may be configured to receive the grouped logs from the grouping module 44 and perform an initial prioritization (or triage) process to identify and order the logs according to importance, which may be based on various factors and can be predefined.

It also be may noted that the alerts 38 obtained in the compute domain 32 may be detected using ML models. Thus, the ML models in this case may be set with a high sensitivity to consider all possible situations that could be indicative of a real security event. Thus, with additional information, the investigation system 34 may be configured to sort through a larger set of log events to investigate if the logs are related to real issues. Since this may be difficult for a human operator, LLMs and other ML models may be used to assist with the investigations to determine if the logs are malicious or benign.

In some situations, a MDR system may be used by a company that could not normally afford to support their own security team. They might outsource this SOC service to managed devices and services to help them to manage their security. With the SOC systems and methods of the present disclosure, the company may change their business model to include fewer security employees to allow the humans to focus on aspects that are more critical, high-level, or require human decision making, as opposed to tedious reading through hundreds or thousands of logs.

Again, a security analyst may be labeled as Level One (L1) or Level Two (L2), where an L1 analyst may have limited experience or knowledge. These security analysts are often put in charge of performing the tedious tasks. Once they become more proficient, they may be promoted to L2 and help train new L1s as they are onboarded. Thus, in conventional systems, an L1 analyst may perform manual correlations using certain tools and traditional manually written playbooks, but this is quite clumsy and can lead to many mistakes. Thus, a differentiator in the present disclosure is that the investigation procedure, from end to end, can be performed with assistance (at each step) from ML models, LLMs, etc. One of these steps may include actually journalling the playbook automatically with help from an LLM.

Also, in some respects, the investigation system 34 acts as an orchestrator, taking a number of various security analysis tools and putting them together. For instance, as MDR is to put data together, the investigation system 34 of the present disclosure can operate on top of this layer to leverage that data. Furthermore, the investigation system 34 can start with cloud-based logs first and may target cloud data from AWS GuardDuty alerts (e.g., intelligent threat detection), Microsoft Azure alerts, Microsoft Copilot alerts, GCP alerts, etc.

With respect to conventional systems, in order to get answers to certain log questions, it was essentially necessary to hold the hand of a chatbot in order to enter a question. However, with the systems and methods of the present disclosure, the LLM is able to comprehend the logs to find legitimate alerts. Then, a human operator can easily review a smaller sample of alerts to determine how to respond to real security issues. In some respects, the systems and methods of the present disclosure are performing the task of the L1 analyst to uncover potential security threats. Then, this short list can be analyzed with an L2 analyst to determine remediation steps.

Regarding one example, suppose there are a pair of events repeated multiple times in the logs. For example, suppose the events are identified as a "Console Login" and a "Get Sign-in Token." Also, suppose that the automated investigation determines that over time, these two events occur on different days. It may also be investigated that the IP addresses (in these logs) change, but for the Console Login instances, it was always the same IP. The investigation steps of the present disclosure may conclude that from these triggers, it may be determined that the Get Sign-in Token may actually represent a backend (e.g., AWS). In this case, this situation may mean that the log for the cloud is actually even harder to understand.

The logs, from some perspectives, may be considered to be like a text version of a video recording, having a great amount of information for a relatively small amount of content. It may be difficult to understand how a person might go about analyzing such detailed information. However, in the case of AWS, Azure, GCP, and the like, the backend environment may be more compact. When something happens in the backend, there are multiple things triggered in the logs and may be viewable in the frontend. Even a small simple trigger in the backend can be difficult for analysis by human beings to look through, read, and understand what is actually happening. This is where the ML components (e.g., LLM 48, LLM 54, LLM 58, LLM 64) come into play. In particular, the LLM 54 specifically may be involved in log comprehension to understand what the logs are actually describing and why they are triggered. The LLM 54 (and other LLMs) may be configured to understand the important aspects of the logs and filter out the noise. The systems and methods of the present disclosure may change how potential security threats are investigated. In some respects, the ML techniques may handle the dirty work, leaving humans with higher-level analysis and focusing on asking certain users about various unforeseen root causes that cannot be captured by machines, such as various login behaviors (regarding the above login example).

Another aspect of the present disclosure that is believed to be novel with respect to conventional systems is that a log (or group of logs) can be treated as if it is a word. The investigation system 34 is configured to take this log (or group of logs) as a word and combine it with other related logs (or groups) as if there were a sentence or paragraph. Then, with analysis and removal of irrelevant data, the LLMs and security teams can better understand this paragraph.

Some technical differentiations with respect to conventional systems show that the present disclosure is configured for auto-investigation based on logic-based reasoning. This may include Symbolic, Relational, and Hierarchical Planning. Also, the auto-investigation provides better reliability than AI agents that cannot perform well after more than about ten steps. The systems and methods described herein are configured to use ML models (e.g., LLM, anomaly detection, etc.) at the leaf node. The present disclosure is also configured to provide correlation across different data sources (e.g., SSO, EDR, NDR, etc.). This may be similar to XDR. Another difference is that the present disclosure is configured to extract more signals than just correlating the existing signal. Also, the present systems can use identity tracking to nail down the same users.

Further distinctions show that the present disclosure is configured to find evidence via "log comprehension." This may include reducing false positives (false alarm) by understanding the past behavior of various users. Also, the present disclosure can explain false positives with evidence, thereby describing what actually happened instead of simply lacking the evidence about true positives (e.g., an actual cyber security attack). Furthermore, the present disclosure may be configured to learn customers' institutional knowledge from one single example, in some cases. The present disclosure may also include embodiments with in-house (on-prem) fine-tuned LLM. This allows the systems and methods to auto-generate investigation reports and interact with users to get feedback.

One benefit or purpose of log comprehension, as described herein, is to decide whether a log is indicative of a malicious or benign event. With this technique, the present embodiments are able to reduce a lot of false alarms because they can recognize, for example, when certain sessions or behavior sequences are similar to a sequence that the user has been using all along. From this, the systems can determine that the behavior is legit. Then, for an even better training process, the systems and methods of the present disclosure can figure out what a session is trying to do, whether it is something that is generally done.

Again, the LLMs described herein may be trained on in-house data to better suit the actions and behaviors of the compute domains being monitored or investigated. From the logs, the LLMs can, to some degree, perform a summarization of activities, behaviors, patterns, end user actions, etc. They can summarize how many events there are and even understand the correlations of the events. They may determine which particular event happened first to determine root causes. They can investigate a statistical event and then give a summary of what the user most likely was trying to do. Many times, the LLM may initially infer that such events are actual security attacks. Thus, additional analysis by more LLMs and more human involvement can fine-tune the analysis.

As long as there is a key event that looks suspicious, the LLMs will think that the whole session is an attack. This is another differentiator from existing technology and one reason why in-house training of the LLM can be beneficial. Another aspect of differentiation from conventional systems is that the investigation system 34 is configured to automatically generate a security playbook, which means that when it comes to alerts, the investigation can start with an initial template instead requiring a new security team to start from nothing. The automatically constructed playbook can identify phishing alerts, email alerts, etc. and can automatically check various aspects of the compute domains, which may differ from one customer to another.

One way that a playbook or security investigating plan may be generated is defined in "Bias reformulation for one-shot function induction," by Dianhuan Lin, Eyal Dechter, Kevin Ellis, Joshua Tenenbaum, and Stephen Muggleton, Frontiers in Artificial Intelligence and Applications, 2014, 525-530, IOS Press, the contents of which are incorporated by reference herein. This includes a high-level hierarchical planning strategy.

Regarding auto investigation, this may be referred to as an autopilot in a logical form. It is also relational, meaning that when one user is investigated, the embodiments of the present disclosure are able to pivot to another user based on how they are related. Not only is it automated, but also it is powerful. It can jump from one user to another user, then jump to another object. Then, that object may allow the present system to pivot to another user, etc., in a systematic way. This may be viewed as a spider web type of investigation or a kind of subtle investigation.

Additionally, in some embodiments, EDR systems of the present disclosure may perform hierarchical planning in the investigation. Basically, the attack stage may be breaking down into two different parts. With respect to the MITRE ATT&CK described herein, there are different attack stages. The EDR systems may use LLMs as described herein to divide and conquer for uncovering the attack. When the investigation of the present disclosure is performed, the systems and methods try to find a signal for each stage of the attack. Each stage itself can be broken down into different types of signals based on what data exists. A hierarchical goal involves a way to drive the investigation to realize it should look for (and get) this signal. In this sense, the methods are easy to execute and also reusable. The generated plan includes how the systems are able to do this hierarchical planning. Basically, the LLMs may have the building blocks to give it flexibility, as opposed to rigid human written playbook. The investigation system 34 is able to plan a different type of playbook, specially focused on the compute domain 32 being monitored. It can also automatically assemble a new playbook based on particular scenarios. In some respects, the LLM (e.g., GPT, chatbot, NLP system, etc.) may generate a playbook using human input and prompt engineering strategies.

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A method comprising steps of:

receiving logs related to security alerts from multiple sources, the security alerts representing potential cyber security threats in a compute domain; and performing an automated investigation procedure configured to determine whether the logs represent actual cyber security threats, the automated investigation procedure including a plan generation stage in which high-level logical steps are planned for analyzing the logs and retrieving evidences for proving it either malicious or benign, wherein the plan generation stage generates an executable investigation playbook comprising an ordered set of evidence-retrieval steps, a log comprehension stage in which details of the logs are analyzed to obtain observations of the logs for a case, wherein the observations comprise a structured knowledge layer linking events and entities in the logs, a plan execution stage in which the high-level logical steps of the plan generation stage are executed with respect to the observations of the logs to retrieve evidence specified by the executable investigation playbook, a reasoning stage to conclude the case as malicious or benign based on the retrieved evidence, and a re-planning stage to generate a new investigation plan for newly discovered entities or signals of the case or a new case, wherein the newly discovered entities or signals are identified during the plan execution stage and cause regeneration of the executable investigation playbook to include additional evidence-retrieval steps.

2. The method of claim 1, wherein the plan generation stage is configured to receive planning assistance from a neural-symbolic AI model including a Large Language Model (LLM), wherein the neural-symbolic AI model combines symbolic reasoning over structured knowledge with neural inference by the LLM to generate the executable investigation playbook.

3. The method of claim 2, wherein the plan generation stage is further configured to receive planning assistance from a security expert knowledge, wherein the security expert knowledge is provided by a security team or auto-acquired by (1) learning from humans' past investigation stored in case management system, (2) learning from past live feedback, or (3) learning from provided textbooks, and wherein the security expert knowledge constrains or guides generation of the executable investigation playbook by defining permissible investigation steps, evidence types, or reasoning rules.

4. The method of claim 3, where in the security expert knowledge is (1) encoded as plain texts and used via Retrieval Augmented Generation (RAG) in the LLM or (2) encoded as a knowledge graph and leveraged by the neural-symbolic AI model.

5. The method of claim 1, wherein the plan generation stage involves creating and editing a cyber security investigation and response playbook that is executed during the plan execution stage.

6. The method of claim 1, wherein the plan generation stage involves logic-based abductive reasoning, and wherein the logic-based abductive reasoning for reversely inferring potential root causes of suspicious activities observed in the security alerts.

7. The method of claim 1, wherein the log comprehension stage includes comprehension assistance from generative AI models trained specifically from sequences of events from one or more compute domains.

8. The method of claim 1, wherein the log comprehension stage includes a step of performing an unsupervised learning procedure on the logs to obtain a knowledge layer about the intent of user activities.

9. The method of claim 1, wherein the plan execution stage includes executing a variety of different actions.

10. The method of claim 9, wherein the variety of different actions include (1) a step of presenting auto-generated predefined questions to one or more end users regarding the potential cyber security threats, (2) a step of auto translating a natural language question to database queries or Application Programming Interface (API) calls, or (3) a step of retrieving answers to investigation questions specified in the plan generation stage using institutional knowledge specific to each company, where the institutional knowledge is via Retrieval Augmented Generation (RAG) in a Large Language Model (LLM).

11. The method of claim 1, wherein the re-planning stage involves generating a new investigation plan for entities or signals discovered from an earlier plan execution stage.

12. The method of claim 1, wherein the automated investigation procedure further includes a report generation stage in which results of executing the high-level logical steps of the plan generation stage are provided to a security team.

13. The method of claim 1, wherein the logs are obtained using Machine Learning (ML) models by measuring or testing email systems, cloud systems, Security Information and Event Management (SIEM) systems, Endpoint security tools including Endpoint Detection and Response (EDR) systems, Antivirus systems, device management systems, Network security tools including Network Detection and Response (NDR) systems, firewalls, proxies, virtual private network, web applications, secure service access edge (SASE), code development systems including source code management, continuous integration, and continuous deployment Managed Detection and Response (MDR) systems, Extended Detection and Response (XDR) systems, identity detection systems, and deception detection systems, of the compute domain.

14. A system comprising:

a processing device, and memory configured to store a computer program having logical code for investigating security threats in a compute domain being monitored, the computer program including instructions that, when executed, enable the processing device to receive logs related to security alerts from multiple sources, the security alerts representing potential cyber security threats in a compute domain; and perform an automated investigation procedure configured to determine whether the logs represent actual cyber security threats, the automated investigation procedure including a plan generation stage in which high-level logical steps are planned for analyzing the logs and retrieving evidences for proving it either malicious or benign, wherein the plan generation stage an executable investigation playbook comprising an ordered set of evidence-retrieval steps, a log comprehension stage in which details of the logs are analyzed to obtain observations of the logs for a case, wherein the observations comprise a structured knowledge layer linking events and entities in the logs, a plan execution stage in which the high-level logical steps of the plan generation stage are executed with respect to the observations of the logs to retrieve evidence specified by the executable investigation playbook, a reasoning stage to conclude the case as malicious or benign based on the retrieved evidence, and a re-planning stage to generate a new investigation plan for newly discovered entities or signals of the case or a new case, wherein the newly discovered entities or signals are identified during the plan execution stage and cause regeneration of the executable investigation playbook to include additional evidence-retrieval steps.

15. The system of claim 14, wherein the plan generation stage is configured to receive planning assistance from a neural-symbolic AI model including a Large Language Model (LLM), and wherein the plan generation stage is further configured to receive planning assistance from a security expert knowledge, wherein the security expert knowledge is provided by a security team or auto-acquired by (1) learning from humans' past investigation stored in case management system (2) learning from past live feedback, or (3) learning from provided textbooks.

16. The system of claim 14, wherein the plan generation stage involves creating and editing a cyber security investigation and response playbook that is executed during the plan execution stage.

17. The system of claim 14, wherein the plan execution stage includes executing a variety of different actions.

18. The system of claim 17, wherein the variety of different actions include (1) a step of presenting auto-generated predefined questions to one or more end users regarding the potential cyber security threats, (2) a step of auto translating an natural language question to database queries or Application Programming Interface (API) calls, or (3) a step of retrieving answers to investigation questions specified in the plan generation stage using institutional knowledge specific to each company, where the institutional knowledge is via Retrieval Augmented Generation (RAG) in a Large Language Model (LLM).

19. A non-transitory computer-readable medium configured to store computer logic having instructions that, when executed, cause one or more processing devices to:

receiving logs related to security alerts from multiple sources, the security alerts representing potential cyber security threats in a compute domain; and performing an automated investigation procedure configured to determine whether the logs represent actual cyber security threats, the automated investigation procedure including a plan generation stage in which high-level logical steps are planned for analyzing the logs and retrieving evidences for proving it either malicious or benign, wherein the plan generation stage generates an executable investigation playbook comprising an ordered set of evidence-retrieval steps, a log comprehension stage in which details of the logs are analyzed to obtain observations of the logs for a case, wherein the observations comprise a structured knowledge layer linking events and entities in the logs, a plan execution stage in which the high-level logical steps of the plan generation stage are executed with respect to the observations of the logs to retrieve evidence specified by the executable investigation playbook, a reasoning stage to conclude the case as malicious or benign based on the retrieved evidence, and a re-planning stage to generate a new investigation plan for newly discovered entities or signals of the case or a new case, wherein the newly discovered entities or signals are identified during the plan execution stage and cause regeneration of the executable investigation playbook to include additional evidence-retrieval steps.

20. The non-transitory computer-readable medium of claim 19, wherein the logs are obtained using Machine Learning (ML) models by measuring or testing email systems, cloud systems, Security Information and Event Management (SIEM) systems, Endpoint security tools including Endpoint Detection and Response (EDR) systems, Antivirus systems, device management systems, Network security tools including Network Detection and Response (NDR) systems, firewalls, proxies, virtual private network, web applications, secure service access edge (SASE), code development systems including source code management, continuous integration, and continuous deployment Managed Detection and Response (MDR) systems, Extended Detection and Response (XDR) systems, identity detection systems, and deception detection systems, of the compute domain.

* * * * *